United States Patent
Na et al.

(10) Patent No.: US 8,440,361 B2
(45) Date of Patent: May 14, 2013

(54) MONOPOLAR SEPARATOR WITH AN INSULATION LAYER FOR A FUEL CELL SYSTEM

(75) Inventors: Youngseung Na, Suwon-si (KR); Inseob Song, Suwon-si (KR); Junwon Suh, Suwon-si (KR); Yeongchan Eun, Suwon-si (KR); Seongjin An, Suwon-si (KR); Gilltae Roh, Suwon-si (KR); Donguk Lee, Suwon-si (KR); Sungwon Jeong, Suwon-si (KR); Seokrak Chang, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1081 days.

(21) Appl. No.: 12/050,838

(22) Filed: Mar. 18, 2008

(65) Prior Publication Data

US 2009/0053574 A1 Feb. 26, 2009

(30) Foreign Application Priority Data

Aug. 20, 2007 (KR) .................. 10-2007-0083635

(51) Int. Cl.
 *H01M 8/10* (2006.01)
(52) U.S. Cl.
 USPC .......................... 429/457; 429/514

(58) Field of Classification Search .............. 429/457, 429/514
See application file for complete search history.

(56) References Cited

U.S. PATENT DOCUMENTS

| 2002/0076597 A1 | 6/2002 | Chang et al. | |
|---|---|---|---|
| 2004/0137299 A1* | 7/2004 | Mazza et al. | 429/34 |
| 2005/0164064 A1* | 7/2005 | Cho et al. | 429/34 |
| 2006/0127741 A1* | 6/2006 | Muller et al. | 429/38 |

FOREIGN PATENT DOCUMENTS

| JP | 2001-256991 | 9/2001 |
|---|---|---|
| JP | 2002-050390 | 2/2002 |
| JP | 2003-051317 | 2/2003 |
| JP | 2004-146265 A | 5/2004 |
| KR | 2001-0091667 A | 10/2001 |
| KR | 2006-0023501 A | 3/2006 |

* cited by examiner

*Primary Examiner* — Ula C Ruddock
*Assistant Examiner* — Frank Chernow
(74) *Attorney, Agent, or Firm* — Knobbe, Martens, Olson & Bear LLP

(57) ABSTRACT

A fuel cell system with reduced volume through decreasing the thickness of a stack comprises: a stack which comprises a plurality of membrane electrode assemblies stacked so that the cathode electrodes face each other and the anode electrodes face each other, and separators that are interposed between the membrane electrode assemblies, and which have a flow path passing through from a first face to a second face on a region corresponding to a region where each cathode electrode or anode electrode is formed.

15 Claims, 5 Drawing Sheets

MONOPOLAR SEPARATOR WITH AN INSULATION LAYER FOR A FUEL CELL SYSTEM

CROSS-REFERENCE TO RELATED APPLICATION

This application claims priority to and the benefit of Korean Patent Application No. 10-2007-0083635, filed on Aug. 20, 2007 in the Korean Intellectual Property Office (KIPO), the entire contents of which is incorporated herein by reference.

BACKGROUND

1. Technical Field

The present disclosure relates generally to a fuel cell system, and more particularly, to a fuel cell system which may reduce the volume of the fuel cell system by decreasing thickness of a stack.

2. Description of the Related Art

A fuel cell system is a power generation system for converting chemical energy from a reaction between an oxidant and hydrogen contained in a fuel, for example, a hydrocarbon-based material such as methanol, ethanol, and natural gas, to electrical energy.

Examples of fuel cell systems include polymer electrolyte membrane fuel cell (hereinafter, referred to as "PEMFC") systems and direct methanol fuel cell (hereinafter, referred to as "DMFC") systems.

Generally, a PEMFC system comprises a stack that generates electrical energy in a reaction between hydrogen and oxygen, and a reformer that generates hydrogen by reforming fuel. The PEMFC system typically has a high energy density and a high output, but uses hydrogen as the fuel and uses accessory devices such as a fuel reformer to generate the hydrogen fuel by reforming methane, methanol, and natural gas.

On the other hand, the DMFC system produces electricity by a direct electrochemical reaction between methanol as the fuel and oxygen as the oxidant. The DMFC system typically has a high energy density and a high electrical power density, and because it directly uses a liquid fuel such as methanol, accessory devices such as reformers are not required. Storage and supply of fuel is easy.

In the PEMFC and DMFC, the electricity generating stack substantially comprises a plurality of membrane electrode assemblies (hereinafter referred to as "MEA"), and separators or bipolar plates sequentially stacked. The MEA comprises a membrane interposed between an anode electrode and a cathode electrode. Accordingly, the stack of the PEMFC system and the DMFC system comprises a separator interposed between an anode electrode and a cathode electrode of two adjacent MEAs facing each other and stacking these components together. The separator has a fuel flow path formed on one side thereof and an air flow path formed on the other side thereof, which supplies the anode electrode and the cathode electrode with externally supplied fuel and air.

The thickness of the stack is determined according to the number of MEAs and separators, and the respective thicknesses of the MEAs and the separators. Where the number of MEAs and separators is large, the thickness and volume of the stack increases to the point that the stack cannot be used in portable systems.

SUMMARY

Accordingly, an object is to provide a fuel cell system that can reduce the volume of the fuel cell system by decreasing the thickness of a stack.

Additional advantages, objects and features will be set forth in part in the description which follows and in part will become apparent to those having ordinary skill in the art upon examination of the following or may be learned from practice thereof.

Accordingly, an aspect provides a fuel cell system, comprising a stack including: a plurality of membrane electrode assemblies stacked so that the cathode electrodes face each other and the anode electrodes face each other; and a plurality of separators that are interposed between the membrane electrode assemblies and have a flow path passing through from a first surface to a second surface on a region corresponding to a region where each cathode electrode or anode electrode is formed. The separator may comprise an insulation layer and, first and second current collectors respectively coupled to the first surface and the second surface, and the flow path may be formed by passing through the insulation layer, the first current collector and the second current collector. The insulation layer may comprise a first region formed in central region of the insulation layer so as to be combined with the first and second current collectors and a second region formed in peripheral region of the first region so as not to be combined with the first and second current collectors.

The separator may comprise a cathode separator that comprises a cathode insulation layer, a first cathode current collector formed on a first face of the cathode insulation layer, and a second current collector formed on a second face of the cathode insulation layer, the flow path being formed as an air flow path, and an anode separator having an anode insulation layer, a first anode current collector formed on a first face of the anode insulation layer, and a second anode current collector formed on a second face of the anode insulation layer, the flow path being formed as a fuel flow path.

The air flow path and the fuel flow path may be formed in zig-zag type or meander type.

The cathode separator may comprise an air inlet formed at an upper part of one side of the cathode separator so as to be connected to the air flow path and an air outlet formed at a lower part of the other side of the cathode separator so as to be connected to the air flow path. The anode separator may comprise a fuel inlet formed at a lower part of one side of the anode separator so as to be connected to the fuel flow path and a fuel outlet formed at an upper part of the other side of the anode separator so as to be connected to the fuel flow path.

The cathode separator may further comprise a fuel path that is respectively formed at the lower part of one side of the cathode separator and at the upper part of the other side of the cathode separator. The anode separator may further comprise an air path that is respectively formed at the upper part of one side of the anode separator and at the lower part of the other side of the anode separator.

The cathode separator may comprise a first cathode terminal protruded above the first cathode current collector and a second cathode terminal protruded above the second cathode current collector. The anode separator may comprise a first anode terminal protruded above the first anode current collector and a second anode terminal protruded above the second anode current collector. The first anode terminal may be electrically coupled to the first cathode terminal of the cathode separator adjacent in the direction of the first anode terminal and the second anode terminal may be electrically coupled to the second cathode terminal of the cathode separator adjacent in the direction of the first anode terminal.

The first anode current collector may be electrically coupled to the first cathode current collector of the cathode separator adjacent in the direction of the first anode current collector and the second anode current collector may be electrically coupled to the second cathode current collector of the cathode separator adjacent in the direction of the first anode current collector.

The stack may comprise end plates contacted to outer faces of membrane electrode assembly located at both ends of the stacked membrane electrode assemblies, where the end plates may comprise end insulation layers, end current collectors formed on surfaces facing to the membrane electrode assemblies and flow path grooves formed in the end current collectors and the insulation layers. The polarities of the end current collectors may be different each other. Further, the flow path groove may function as an air flow path or a fuel flow path according to the polarity of the end current collectors at the both ends of the stack. The air flow path may be formed in a shape corresponding to the air path and the fuel flow path may be formed in a shape corresponding to the fuel path.

The end plates may comprise an air feeding hole located at outmost of any one of the both ends of the stack and formed at the position corresponding to the air inlet, and a fuel feeding hole formed at the position corresponding to the fuel inlet. The end plates may comprise an air outlet located at outmost of any one of the both ends of the stack and formed at the position corresponding to the air outlet, and a fuel outlet formed at the position corresponding to the fuel outlet.

The membrane electrode assembly may comprise an electrolyte membrane, a cathode electrode formed on one face of the electrolyte membrane, an anode electrode formed on other face of the electrolyte membrane and a gasket formed so as to surround the electrolyte membrane and side faces of the cathode electrode and the anode electrode, where the gasket may further comprise gasket paths formed at the positions corresponding to the air inlet, the air outlet, the fuel inlet and the fuel outlet.

The fuel cell system may further comprise an air supplying unit for supplying air to the stack, a fuel supplying unit for supplying fuel to the stack and a fuel tank connected to the fuel supplying unit to store fuel.

The fuel cell system may further comprise an air supplying unit for supplying air to the stack, a fuel supplying unit for supplying fuel to the stack, a fuel tank connected to the fuel supplying unit to store fuel and a reformer installed between the fuel supplying unit and the stack.

Some embodiments provide a fuel cell system comprising a stack comprising: a plurality of membrane electrode assemblies stacked with cathode electrodes of adjacent membrane electrode assemblies facing each other and anode electrodes of adjacent membrane electrode assemblies facing each other; and a plurality of separators interposed between the membrane electrode assemblies, each separator comprising a flow path passing therethrough from a first surface of the separator to a second surface of the separator in a region corresponding to a region of each cathode electrode or anode electrode of an adjacent membrane electrode assembly.

In some embodiments, the separator comprises: an insulation layer, and a first current collector and a second current collector coupled to the first surface and the second surface of the insulation layer, respectively; and the flow path passes through the insulation layer, the first current collector, and the second current collector. In some embodiments, the insulation layer comprises: a first region formed in central region of the insulation layer comprising the first current collector and the second current collector; and a second region peripheral to the first region that does not include the first current collector or the second current collector.

In some embodiments, the separator comprises: a cathode separator comprising a cathode insulation layer, a first cathode current collector formed on a first face of the cathode insulation layer, and a second current collector formed on a second face of the cathode insulation layer, and wherein the flow path is an air flow path; and an anode separator comprising an anode insulation layer, a first anode current collector formed on a first face of the anode insulation layer, and a second anode current collector formed on a second face of the anode insulation layer, and wherein the flow path is a fuel flow path.

In some embodiments, the air flow path and the fuel flow path each comprise a zig-zag, meander-type, or serpentine portion.

In some embodiments, the cathode separator comprises an air inlet at an upper part of a first side of the cathode separator connected to the air flow path, and an air outlet formed at a lower part of the second side of the cathode separator connected to the air flow path, and the anode separator comprises a fuel inlet at a lower part of a first side of the anode separator connected to the fuel flow path, and a fuel outlet at an upper part of the second side of the anode separator connected to the fuel flow path. In some embodiments, the cathode separator comprises a fuel path at the lower part of the first side of the cathode separator and at the upper part of the second side of the cathode separator, respectively, and the anode separator comprises an air path at the upper part of the first side of the anode separator and at the lower part of the second side of the anode separator, respectively.

In some embodiments, the cathode separator comprises a first cathode terminal extending above the first cathode current collector and a second cathode terminal extending above the second cathode current collector, and the anode separator comprises a first anode terminal extending above the first anode current collector and a second anode terminal extending above the second anode current collector.

In some embodiments, the first anode terminal is electrically coupled to the first cathode terminal of the cathode separator adjacent thereto in the direction of the first anode terminal, and the second anode terminal is electrically coupled to the second cathode terminal of the cathode separator adjacent thereto in the direction of the first anode terminal. In some embodiments, the first anode current collector is electrically coupled to the first cathode current collector of the cathode separator adjacent thereto in the direction of the first anode current collector, and the second anode current collector is electrically coupled to the second cathode current collector of the cathode separator adjacent thereto in the direction of the first anode current collector.

In some embodiments, the stack comprises end plates contacting outer faces of membrane electrode assemblies located at each end of the stacked membrane electrode assemblies, and the end plates comprise end insulation layers, end current collectors formed on surfaces facing to the membrane electrode assemblies, and flow path grooves formed in the end current collectors and the insulation layers. In some embodiments, the polarities of the end current collectors of the end plates are different from each other. In some embodiments, the flow path groove comprises an air flow path or a fuel flow path according to the polarity of the end current collectors, and the air flow path has a shape corresponding to the air path and the fuel flow path has a shape corresponding to the fuel path. In some embodiments, the end plates comprise an air feeding hole at an end of the stack at a position corresponding to the air inlet, and a fuel feeding hole at an end of the stack at a position corresponding to the fuel inlet.

In some embodiments, the end plates comprise an air outlet located at an end of the stack at a position corresponding to the air outlet, and a fuel outlet at an end of the stack at a position corresponding to the fuel outlet.

In some embodiments, the membrane electrode assembly comprises an electrolyte membrane, a cathode electrode formed on a first face of the electrolyte membrane, an anode electrode formed on a second face of the electrolyte membrane, and a gasket surrounding the electrolyte membrane, and side faces of the cathode electrode and the anode electrode, and the gasket comprises gasket paths at positions corresponding to the air inlet, the air outlet, the fuel inlet, and the fuel outlet.

Some embodiment further comprise: an air supplying unit configured for supplying air to the stack; a fuel supplying unit configured for supplying fuel to the stack; and a fuel tank connected to the fuel supplying unit configured to store fuel.

Some embodiment further comprise: an air supplying unit configured for supplying air to the stack; a fuel supplying unit configured for supplying fuel to the stack; a fuel tank connected to the fuel supplying unit configured to store fuel; and a reformer installed between the fuel supplying unit and the stack.

BRIEF DESCRIPTION OF THE DRAWINGS

The above and other objects, features and advantages will be more apparent from the following detailed description taken in conjunction with the accompanying drawing, in which.

DETAILED DESCRIPTION OF CERTAIN EMBODIMENTS

Figure 1:
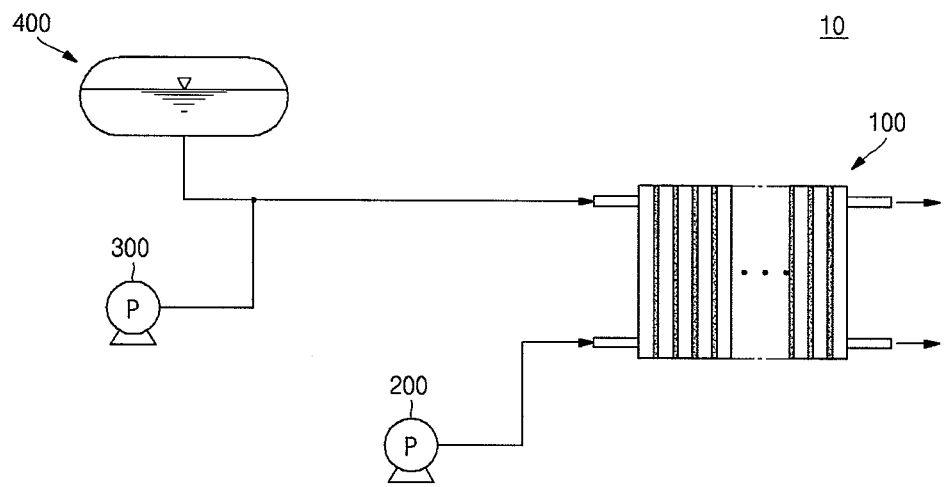
FIG. 1 is a schematic diagram illustrating an embodiment of a fuel cell system.

Hereinafter, certain embodiments will be described in detail with reference to the accompanying drawing. The aspects and features and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are exemplary details provided to assist those of ordinary skill in the art in a comprehensive understanding thereof, and is defined within the scope of the appended claims. Like reference numbers in the drawings are used for the same or similar elements across the various drawings.

Figure 2:
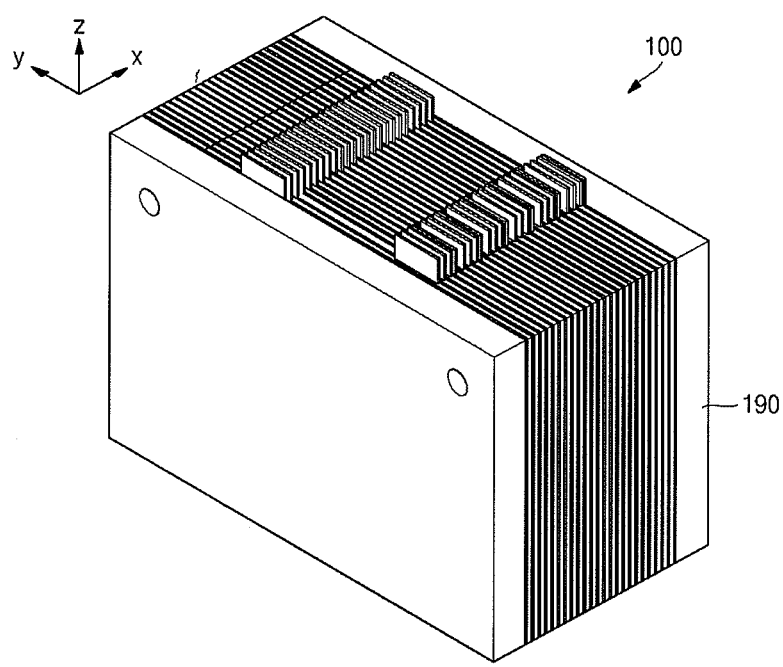
FIG. 2 is a perspective view illustrating an embodiment of a stack.
Figure 3:
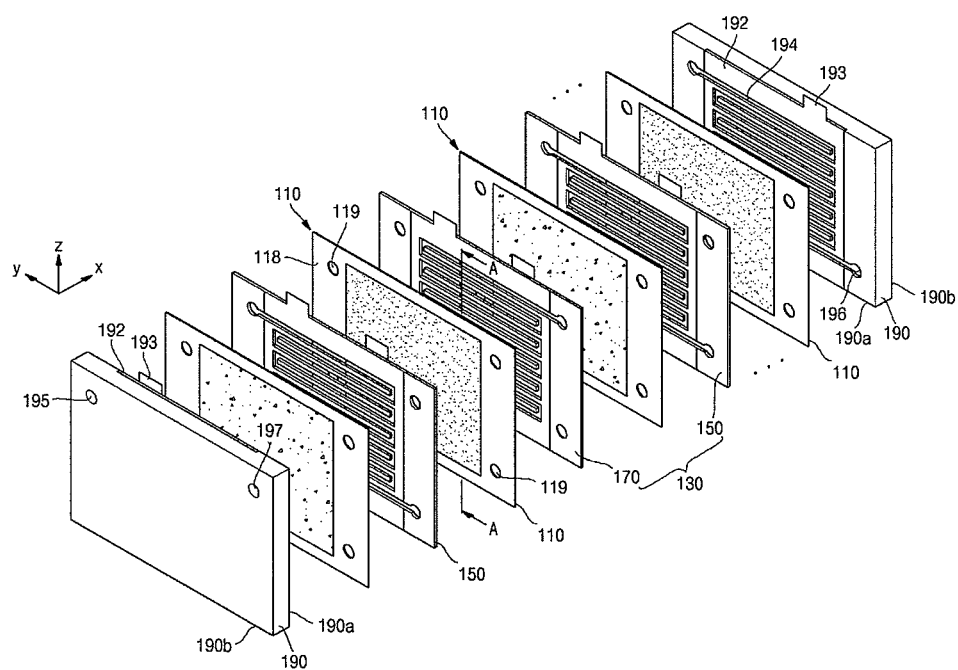
FIG. 3 is an exploded perspective view illustrating an embodiment of the stack.
Figure 4:
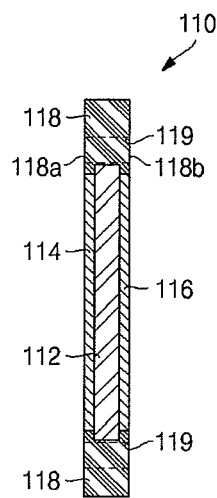
FIG. 4 is a sectional view taken along section line A-A of FIG. 3.
Figure 5:
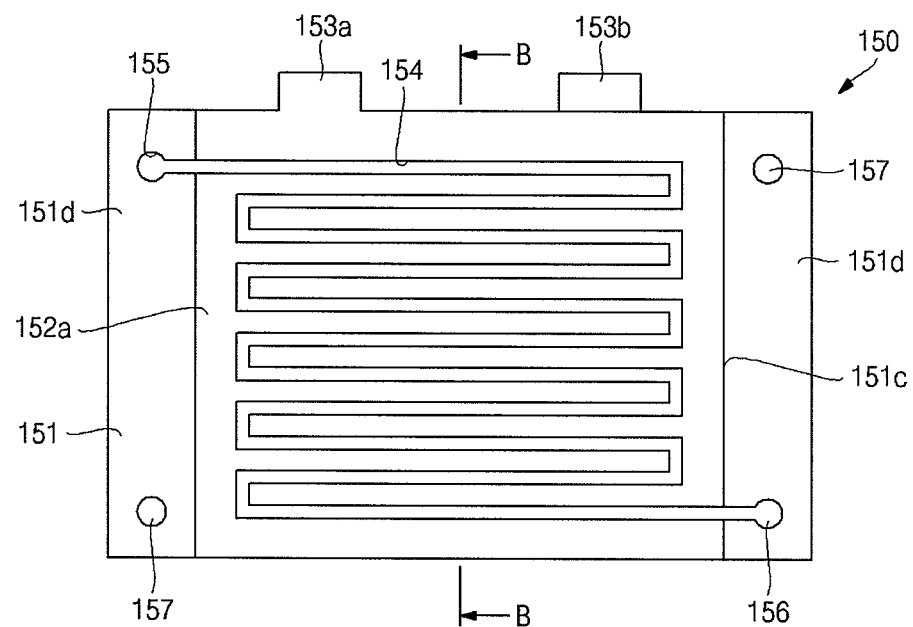
FIG. 5 is a front view illustrating an embodiment of a cathode separator.
Figure 6:
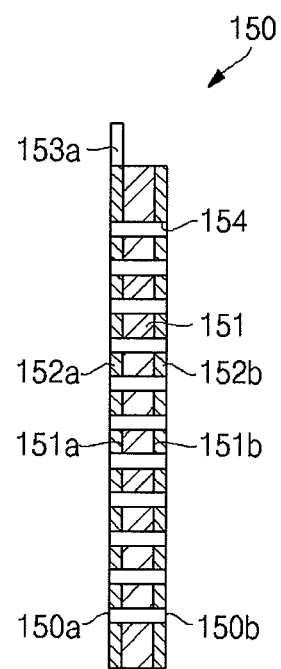
FIG. 6 is a sectional view taken along section line B-B of FIG. 5.
Figure 7:
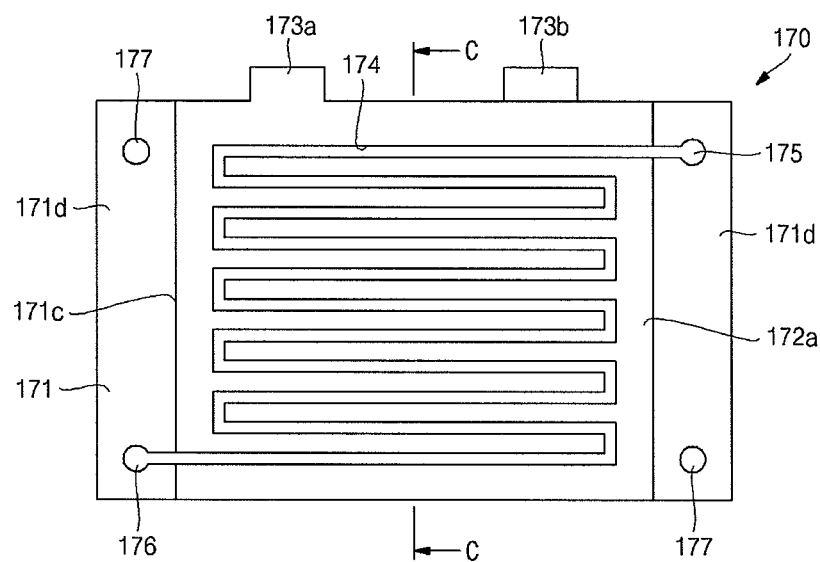
FIG. 7 is a front view illustrating an embodiment of an anode separator.
Figure 8:
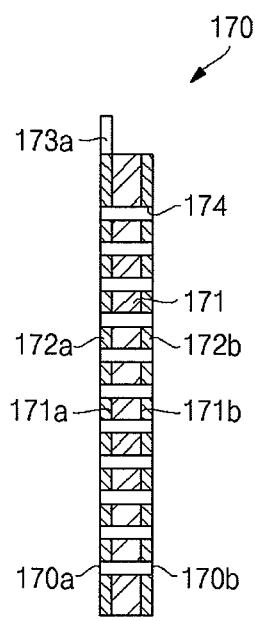
FIG. 8 is a sectional view taken along C-C line of FIG. 7.

FIG. 1 is a schematic diagram illustrating an embodiment of a fuel cell system. FIG. 2 is a perspective view illustrating a stack according to the embodiment. FIG. 3 is an exploded perspective view illustrating the stack. FIG. 4 is a section view taken along A-A line of FIG. 3. FIG. 5 is a front view illustrating a cathode separator according to the embodiment. FIG. 6 is a section view taken along B-B line of FIG. 5. FIG. 7 is a front view illustrating an anode separator according to the embodiment. FIG. 8 is a section view taken along C-C line of FIG. 7.

Referring to FIGS. 1 to 8, the fuel cell system 10 comprises a stack 100, an air supplying unit 200, a fuel supplying unit 300, and a fuel tank 400. Because the stack 100 of the fuel cell system 10 is thinner than a typical stack of the same capacity, the total volume is reduced. Hereinafter, a first surface means a surface facing the −x direction in FIG. 2, and a second face means a surface facing the x direction. Further, a first side faces the y direction, and a second side faces the −y direction. An upper side faces the z direction and a lower side faces the −z direction.

The fuel cell system 10 may comprise a direct methanol fuel cell (DMFC) system that receives an alcoholic fuel such as methanol, ethanol, and the like, and air, and which generates electrical energy by oxidation reaction of hydrogen contained in the fuel and reduction reaction of oxygen contained in the air. The fuel cell system 10 may be coupled to a particular electronic device through a cable or integrally mounted on the electronic device. The fuel cell system 10 is constructed as a generating system that outputs electrical energy generated by an electrochemical reaction between the fuel and oxygen to the electronic device.

Referring to FIG. 3, the stack 100 comprises a membrane electrode assembly 110 and a separator 130. Further, the stack 100 comprises an end plate 190. In the stack 100, electrical energy is generated by a chemical reaction between the air supplied from the air supplying unit 200 (FIG. 1) and the fuel supplied from the fuel supplying unit 300 (FIG. 1). In the stack 100, membrane electrode assemblies 110 and separators 130 are alternately stacked, with and the end plates 190 are stacked at the ends in contact therewith. The components of the stack 100 may be secured by any suitable means, for example, using one or more bolts (not shown), or a wire or a band (not shown).

Referring to FIG. 4, the membrane electrode assembly 110 comprises an electrolyte membrane 112, a cathode electrode 114 formed on a first surface of the electrolyte membrane 112 and an anode electrode 116 formed on a second surface of the electrolyte membrane 112. Further, the membrane electrode assembly 110 may comprise a gasket. The membrane electrode assemblies 110 are sequentially stacked with the separators 130 interposed therebetween, as shown in FIG. 3. In the illustrated embodiment, the membrane electrode assemblies 110 are stacked so that each cathode electrode 114 faces a cathode electrode 114 of adjacent membrane electrode assembly 110, and each anode electrode 116 faces an anode electrode 116 of adjacent membrane electrode assembly 110. In other words, in the stack 100, the plurality of membrane electrode assemblies 110 are stacked so that the same poles of adjacent membrane electrode assemblies 110 face each other.

The electrolyte membrane 112 transfers hydrogen ions generated at the anode electrode 116 to the cathode electrode 114. The anode electrode 116 decomposes hydrogen contained in the fuel into electrons and protons. The cathode electrode 114 generates water by a reaction between oxygen contained the air supplied by the air supplying unit 200 and the electron and proton received from the anode electrode 116. The cathode electrode 114 comprises an air diffusion layer (not shown) for supplying and diffusing air, a catalytic layer (not shown) that catalyzes the redox reaction of the air, and an electrode supporter (not shown). Further, the anode electrode 116 comprises a fuel diffusion layer (not shown) for supplying and diffusing fuel, a catalytic layer (not shown) that catalyzes the redox reaction of the fuel, and an electrode supporter (not shown). The membrane electrode assembly 110 comprises any suitable structure known in the art for use in a direct methanol fuel cell, and a detailed explanation thereof will be omitted.

The gasket 118 is formed so as to support and surround side surfaces of the electrolyte membrane 112, the cathode electrode 114, and the anode electrode 116. Further, the gasket 118 may further comprise a gasket path 119. The gasket 118 seals the electrolyte membrane 112, the cathode electrode 114, and the anode electrode 116 by contacting the separator 130 in outer region of the separator 130 so as to prevent the air and/or fuel supplied to the cathode electrode 114 or the anode electrode 116 from leaking out of the stack 100.

The gasket path 119 is a hole passing through from a first surface 118a to a second surface 118b. Air or fuel supplied from the exterior of the MEA flows through the hole. The gasket path 119 is formed at the positions corresponding to the positions of an air inlet 155, an air outlet 156, a fuel inlet 175, and a fuel outlet 176 formed in the separator (130; 150, 170). Accordingly, the gasket paths 119 are formed at an upper and a lower part of a first side and an upper and a lower part of a second side of the gasket 118, respectively. Fuel or air flows through the gasket paths 119 according to the position where they are formed, but here, each gasket path 119 is not differentiated by a different designation.

Referring to FIGS. 3 and 5-8, the separator (130; 150, 170) is formed as flat plate comprising first surfaces 150a and 170a and second surfaces 150b and 170b. The separator (130; 150, 170) comprises insulators 151 and 171 including first surfaces 151a and 171a and second surfaces 151b and 171b, first current collectors 152a and 172a, and second current collectors 152b and 172b, respectively, combined with the first surfaces 151a and 171a, and second surfaces 151b and 171b of the insulators 151 and 171. In addition, the separator (130; 150,170) further comprises electrode terminals 153a, 153b, 173a, and 173b outwardly extended from the first current collectors 152a and 172a, and second current collectors 152b and 172b, respectively. The separator (130; 150, 170) further comprises paths 154 and 174, which pass through the second surfaces 150b and 170b from the first surfaces 150a and 170a. Further, the separator (130; 150, 170) comprises inlets 155 and 175, and outlets 156 and 176 for air or fuel flow. In addition, the separator (130; 150, 170) comprises an air path 157 for air flow and a fuel path 177 for fuel flow.

The separator (130; 150, 170) comprises an air flow path 154 or a fuel flow path 174, which passes through the second surfaces 150b and 170b from the first surfaces 150a and 170a. Accordingly, the separator 150 simultaneously supplies air to the cathode electrodes 114 of the membrane electrode assemblies 110 contacting both sides of the separator 150. The separator 170 also simultaneously supplies fuel to the anode electrodes 116 of the membrane electrode assemblies 110 contacting both sides of the separator 170. However, because a conventional separator comprises an air flow path formed on the first surface and a fuel flow path 174 formed on the second surface, a separator plate is typically interposed for separating the air flow path and the fuel flow path 174. The illustrated separator (130; 150, 170) does not comprise the separator plate, and accordingly, the thickness of the separator is relatively thinner.

The separator (130; 150, 170) is arranged between the membrane electrode assemblies 110 in the stack 100 so as to electrically insulate adjacent membrane electrode assemblies 110.

The insulators 151 and 171 are formed as a plate comprising first surfaces 151a and 171a, and second surfaces 151b and 171b. The insulators 151 and 171 are formed of material having a suitable insulating property such as plastic and ceramic. The insulators 151 and 171 have area corresponding to area of the membrane electrode assembly 110. Further, the insulators 151 and 171 comprise first regions 151c and 171c at the central regions of the insulators 151 and 171 where the current collectors 152a, 152b, 172a, and 172b are combined, and second regions 151d and 171d outside of the first regions 151c and 171c where the current collectors 152a, 152b, 172a, and 172b are not combined. Accordingly, the first regions 151c and 171c are formed so as to have area corresponding to area of the cathode electrode 114 or anode electrode 116 of the membrane electrode assembly 110. And, the second regions 151d and 171d are formed so as to have area corresponding to the gasket 118.

The current collectors 152a, 172a, 152b, and 172b are formed as a plate having electrical conductivity, and comprises first current collectors 152a and 172a, and second current collectors 152b and 172b. The first current collectors 152a and 172a, and second current collectors 152b and 172b are formed in a form corresponding to the cathode electrode 114 or anode electrode 116 of the membrane electrode assembly 110. The current collectors 152a, 172a, 152b and 172b may be formed so as to be extended to upper side and lower side of the insulators 151 and 171. The first current collectors 152a and 172a, and second current collectors 152b and 172b are electrically contacted to the cathode electrode 114 or anode electrode 116 of the membrane electrode assembly 110 in contact therewith. Further, because the separator (130; 150, 170) is arranged between the same electrodes of the membrane electrode assembly 110, the first current collectors 152a and 172a, and second current collectors 152b and 172b are electrically coupled to the same electrode of the membrane electrode assembly 110.

Figure 9:
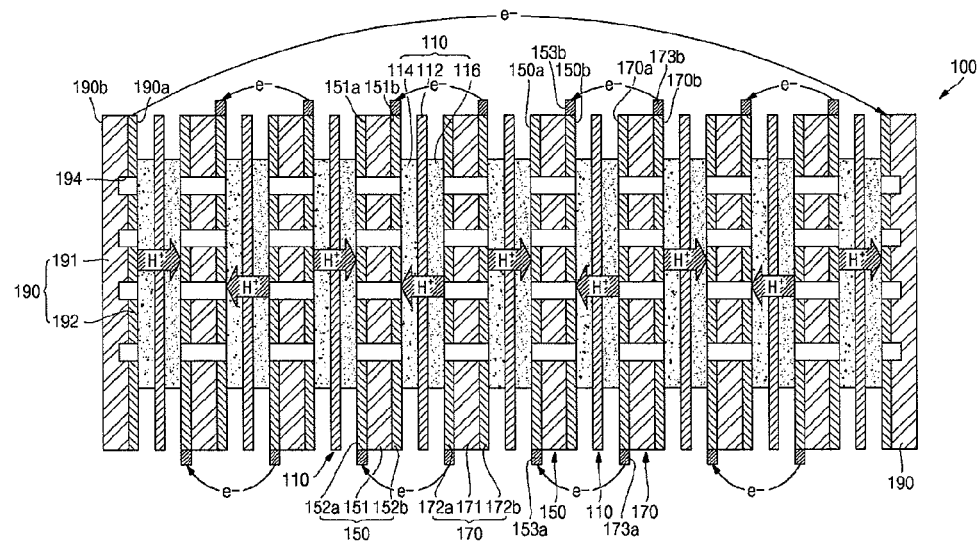
FIG. 9 is a side cross-sectional view illustrating an embodiment of an electrical coupling relationship of the stack.

The electrode terminals 153a, 153b, 173a, and 173b are formed in the current collectors 152a, 172a, 152b, and 172b, respectively, which are formed on the first surfaces 150a and 170a, and the second surfaces 150b and 170b of the separator (130; 150, 170). That is, the electrode terminals 153a, 153b, 173a, and 173b comprise the first terminals 153a and 173a formed in the first current collectors 152a and 172a, and the second terminals 153b and 173b formed in the second current collectors 152b and 172b. The electrode terminals may comprise an end terminal 193 formed in the end plate 190. The electrode terminals 153a, 153b, 173a, and 173b are extended to the upper part or lower part of the stack 100 from the first current collectors 152a and 172a, and the second current collectors 152b and 172b. The first terminals 153a and 173a, and the second terminals 153b and 173b are formed so as to have electrically opposite polarities and be electrically insulated from each other. Accordingly, the first terminals 153a and 173a and the second terminals 153b and 173b are preferably formed spaced in a transverse direction of the separator (130; 150, 170). Referring to FIG. 9, the first terminals 153a and 173a are electrically coupled to first terminals 153a and 173a formed on an adjacent separator (130; 150, 170) sharing a common membrane electrode assembly 110, that is, arranged in direction of the first surfaces 150a and 170a of the separator (130; 150, 170). Further, the second terminals 153b and 173b are electrically coupled to second terminals 153b and 173b formed on an adjacent separator (130; 150, 170) which faces the separator (130; 150, 170) about the membrane electrode assembly 110 arranged in direction of the second surfaces 150b and 170b of the separator (130; 150, 170). On the other hand, the end terminal 193 (FIG. 3) is not electrically coupled to the first terminals 153a and 173a or the second terminals 153b and 173b.

The electrode terminal may be formed with extended current collector, or may be combined with an additional conductive wire.

Referring to FIGS. 5-8, the flow paths 154 and 174 are formed in the first region of the insulators 151 and 171 so as to pass through to the second surface from the first surface of the separator. That is, the flow paths 154 and 174 are formed so as to pass through all of the insulators 151 and 171, first current collectors 152a and 172a, and the second current collectors 152b and 172b formed in the first surfaces 151a and 171a and the second surfaces 151b and 171b of the insulators 151 and 171. The flow paths 154 and 174 may be formed in a zig-zag, meander-type, or serpentine shape in the first regions 151c and 171c with a predetermined width. The flow paths 154 and 174 may be separately formed into the air flow path 154 for air flow and the fuel flow path 174 for fuel flow. The air flow path 154 is formed in the separator 150 arranged between the cathode electrodes 114, and the fuel flow path 174 is formed in the separator 170 arranged between the anode electrodes 116. The air flow path 154 is formed so as to be connected to an air inlet 155 and an air outlet 156 as described below. Accordingly, the air flow path 154 is formed from the upper part of a first side of the separator 150 to a lower part of the second side of the separator 150. Further, the fuel flow path 174 is formed so as to be connected to a fuel inlet 175 and a fuel outlet 176. Accordingly, the fuel flow path 174 is formed from an upper part of the second side of the separator 170 to the lower part of the first side of the separator 170.

The air flow path 154 supplies air simultaneously to the cathode electrodes 114 of the membrane electrode assemblies 110 contacted to the first current collector 152a and the second current collector 152b, respectively. The fuel flow path 174 supplies fuel simultaneously to the anode electrodes 116 of the membrane electrode assemblies 110 contacted to the first current collector 172a and the second current collector 172b, respectively. This will be explained in detail below.

Referring to FIGS. 5 and 7, the inlets 155 and 175 are formed with circular or rectangular holes in the upper part or lower part of the second region 151d and 171d of the insulators 151 and 171 so as to pass through to the second surfaces 151b and 171b from the first surfaces 151a and 171a. The inlets 155 and 175 are formed as the air inlet 155 and the fuel inlet 175.

The air inlet 155 is formed in the separator 150 arranged between the cathode electrodes 114, and the fuel inlet 175 is formed in the separator 170 arranged between the anode electrodes 116. The air inlet 155 and the fuel inlet 175 are formed so as to be connected to the air flow path 154 and the fuel flow path 174, respectively, formed in the first regions 151c and 171c.

The outlets 156 and 176 are formed as circular or rectangular holes in the upper part or the lower part of the second regions 151d and 171d of the insulators 151 and 171 so as to pass through to the second surfaces 151b and 171b from the first surfaces 151a and 171a. The outlets 156 and 176 are formed in proper size according to the amount of fuel and air required in the fuel cell system. The outlets 156 and 176 are formed as the air outlet 156 and the fuel outlet 176. The air outlet 156 is formed in the separator 150 arranged between the cathode electrodes 114, and the fuel outlet 176 is formed in the separator 170 arranged between the anode electrodes 116. The air outlet 156 and the fuel outlet 176 are formed so as to be connected to the air flow path 154 and the fuel flow path 174 formed in the first regions 151c and 171c, respectively. The air outlet 156 and the fuel outlet 176 are not formed in the same separator. However, the air outlet 156 and the fuel outlet 176 are formed on opposite sides of each other provided that two separators are considered as one separator.

The air outlet 156 is formed in a position diagonal from the position in which the air inlet 155 is formed in the insulators 151. That is, if the air inlet 155 is formed on the upper part of a first side of the insulators 151, the air outlet 156 is formed on the lower part of the second side of the insulators 151. The fuel outlet 176 is formed in a position diagonal from the position in which the fuel inlet 175 is formed in the insulators 171. That is, if the fuel inlet 175 is formed in the upper part of the second side of the insulators 171, the fuel outlet 176 is formed in the lower part of the first side of the insulators 171.

The fuel paths 157 are formed in the upper part of the first side and the lower part of the second side, respectively, of the separator 150 where the air inlet 155 and the air outlet 156 are not formed. That is, the fuel paths 157 are formed in the separator 150 arranged between the cathode electrodes 114. Further, the fuel paths 157 are formed at the positions corresponding to the positions of the fuel inlet 175 and the fuel outlet 176, which are formed in the separator 170 arranged between anode electrodes 116. Accordingly, fuel supplied from the exterior flows to an adjacent fuel inlet 175 through the fuel path 157. Further, fuel discharged from the fuel flow path 174 flows to an adjacent fuel outlet 176 through the fuel path 157.

The air paths 177 are formed simultaneously in the lower part of the first side and the upper part of the second side of the separator 170 where the fuel inlet 175 and the air outlet 176 are not formed. That is, the air paths 177 are formed in the separator 170 arranged between the anode electrodes 116. Further, the air paths 157 are formed at the positions corresponding to the positions of the air inlet 155 and the air outlet 156, which are formed in the separator 150 arranged between cathode electrodes 114. Accordingly, air supplied from the exterior flows to an adjacent air inlet 155 through the air paths 177. Further, air discharged from the air flow path 154 flows to an adjacent air outlet 156 through the air paths 177.

Next, the separator 130 will be explained in detail as a cathode separator 150 and an anode separator 170, according to the electrode of the membrane electrode assembly 110 contacting to the separator 130.

Referring to FIGS. 5 and 6, the cathode separator 150 comprises a cathode insulator 151, a first cathode current collector 152a formed on the first surface 151a of the cathode insulator 151 and a second cathode current collector 152b formed on the second surface 151b of the cathode insulator 151. Further, the cathode separator 150 comprises a first cathode terminal 153a and a second cathode terminal 153b. The cathode separator 150 comprises the air flow path 154 for air flow, the air inlet 155 and the air outlet 156 for air flow, and the fuel paths 157 for fuel flow.

The cathode insulator 151 comprises a first region 151c where the first cathode current collector 152a and the second cathode current collector 152b comprise the first surface 151a and the second surface 151b in central region, and a second region 151d, which is formed outside the first region 151c and does not include the current collectors 152a and 152b. In the illustrated embodiment, the first region 151c may be spaced from the first side and the second side of the cathode insulator 151, and may be contacted to the upper side and the lower side of the cathode insulator 151.

The first cathode current collector 152a and the second cathode current collector 152b, respectively, correspond to the first current collector and second current collector as described above. The first cathode terminal 153a and the second cathode terminal 153b correspond to the first terminal and second terminal, respectively.

The air flow path 154 is formed in the first region 151c of the cathode insulator 151 so as to pass through to the second surface 150b of the cathode separator 150 from the first surface 150a of the cathode separator 150. That is, the air flow path 154 is formed so as to pass through all of the cathode insulator 151, the first cathode current collector 152a, and the second cathode current collector 152b formed on the first surface 150a and the second surface 150b of the cathode insulator 151. The air flow path 154 supplies air to the cathode electrodes 114 of the membrane electrode assemblies 110 contacting to the first surface 150a and the second surface 150b of the cathode separator 150 simultaneously.

The air inlet 155 is formed in the upper part of the first side of the cathode separator 150 so as to be connected to the air flow path 154, and air supplied from the exterior flows through the air inlet 155. Further, the air inlet 155 is connected to the air flow path 154 so as to supply air to the air flow path 154. The air outlet 156 is formed in the lower part of the second side of the cathode separator 150 so as to be connected to the air flow path 154, and air discharged from the air flow path 154 flows through the air outlet 156.

The fuel paths 157 are formed in the lower part of the first side and the upper part of the second side of the 150, respectively, and air supplied from the fuel inlet 175 flows through the fuel paths 157.

The anode separator 170 comprises a anode insulator 171, a first anode current collector 172a formed on the first surface 171a of the anode insulator 171, and a second anode current collector 172b formed on the second surface 171b of the anode insulator 171. Further, the anode separator 170 comprises a first anode terminal 173a and a second anode terminal 173b. The anode separator 170 comprises the fuel flow path 174 for air flow, the fuel inlet 175 and the fuel outlet 176 for fuel flow, and the air paths 177 for air flow.

The anode insulator 171 comprises a first region 171c where the first anode current collector 172a and the second anode current collector 172b comprise the first surface 171a and the second surface 171b in central region, and a second region 171d where is formed outside the first region 171c and does not include the current collectors 172a and 172b. In this time, the first region 171c may be spaced from the first side and the second side of the anode insulator 171, and may be contacted to the upper side and the lower side of the anode insulator 171.

The first anode current collector 172a and the second anode current collector 172b correspond to the first current collector and second current collector as described above, respectively. The first anode terminal 173a and the second anode terminal 173b correspond to the first terminal and second terminal, respectively.

The fuel flow path 174 is formed in the first region 171c of the anode insulator 171 so as to pass through to the second surface 170b of the anode separator 170 from the first surface 170a. That is, the fuel flow path 174 is formed so as to pass through all of the anode insulator 171, the first anode current collector 172a, and the second anode current collector 172b formed on the first surface 170a and the second surface 170b of the cathode insulator 171. The fuel flow path 174 supplies fuel to the anode electrodes 116 of the membrane electrode assemblies 110 contacting to the first surface 170a and the second surface 170b of the anode separator 170 simultaneously.

The fuel inlet 175 is formed in the upper part of the first side of the anode separator 170 so as to be connected to the fuel flow path 174, and fuel supplied from the exterior flows through the fuel inlet 175. Further, the fuel inlet 175 is connected to the fuel flow path 174 so as to supply fuel to the fuel flow path 174. The fuel outlet 176 is formed in the lower part of the second side of the anode separator 170 so as to be connected to the fuel flow path 174, and fuel discharged from the fuel flow path 174 flows through the fuel outlet 176.

The air paths 177 are formed in the upper part of the first side and the lower part of the second side of the anode separator 170, respectively, and air supplied from the air inlet 155 flows through the air paths 177.

Referring to FIGS. 3 and 9, the end plate 190 is formed in flat plate comprising an inner surface 190a and an outer surface 190b. The end plate 190 comprises an end insulator 191 and an end current collector 192 disposed on an inner surface of the end insulator 191. The end current collector 192 may further comprise an end terminal 193 extending upwardly. The end plates 190 are arranged at the outmost ends of the stack 100, and formed in a pair. The inner surface 190a of the end plate 190 means a surface facing toward inside the stack 100. Further, the outer surface 190b of the end plate 190 means a surface facing the outside of the stack 100.

The end plate 190 comprises a flow path groove 194 formed in the inner surface 190a where the end current collector 192 is disposed. Further, the end plate 190 comprises an air feeding hole 195 and a fuel feeding hole 197, or an air outlet 196 and a fuel outlet (not shown) according to the position where the end plate 190 is arranged at the outmost end of the stack. The end plate 190 supplies air and fuel to the stack 100. In addition, the end plate 190 supplies air or fuel to the electrode of an adjacent membrane electrode assembly 110. The end plate 190 discharges fuel and air used in the stack 100 out of the stack. Further, the end plate 190 couples the electrode of the membrane electrode assembly 110 and an external electronic device electrically via the end current collector 192.

The end current collector 192 comprises the inner surface end plate 190a of the end plate 190, and contacts to the electrode of an adjacent membrane electrode assembly 110. The end current collector 192 functions as an anode current collector or a cathode current collector according to polarity of the electrode of the membrane electrode assembly 110.

The flow path groove 194 passes through the end current collector 192 and is formed in the end insulator 191 with a predetermined depth. The flow path groove 194 is formed in a shape corresponding to the paths 154 and 174 formed in the separator 130. That is, the flow path groove 194 is formed in a zig-zag, meander or serpentine shape. The flow path groove 194 functions as a fuel flow path groove or an air flow path groove according to the electrode polarities of the membrane electrode assembly 110 contacting the end current collector 192.

The air feeding hole 195 is formed in the end plate 190 in the direction of the first surface and is connected to the air supplying unit 200. The air feeding hole 195 is formed in a position corresponding to the position where the air inlet 155 is formed. Accordingly, the air feeding hole 195 supplies the air inlet 155 and the air paths 157 with air supplied from the air supplying unit 200.

The air outlet 196 is formed in the end plate 190 in the direction of the second surface. The air outlet 196 is formed in the position corresponding to the position where the air outlet 156 is formed. Accordingly, the air outlet 196 discharges water and gas formed during the electricity generating process out of the stack 100.

The fuel feeding hole 197 is formed in the end plate 190 in the direction of the first surface and is connected to the fuel supplying unit 300. The fuel feeding hole 197 is formed in a position corresponding to the position where the fuel inlet 175 is formed. Accordingly, the fuel feeding hole 197 supplies the fuel inlet 175 and the fuel paths 177 of the anode separator 170 with fuel supplied from the fuel supplying unit 300.

The fuel outlet (not shown) is formed in the end plate 190 in the direction of the second surface. The fuel outlet is formed in a position corresponding to the position where the fuel outlet 176 is formed. Accordingly, although the fuel outlet is not shown, the position for formation of it is clear. The fuel outlet discharges carbon dioxide and unreacted fuel from the electricity generating process out of the stack 100.

The air supplying unit 200 is connected to the air feeding hole 195 of the end plate 190 at the end of the stack 100 and supplies air to the air flow path 154 in the stack 100. In some embodiments, the air supplying unit 200 may be connected to the air outlet 196 of the end plate 190 via an additional air duct. The air supplying unit 200 may be any suitable air supplying unit, such as an air pump, an air blower, and the like The fuel supplying unit 300 is connected to the fuel feeding hole 197 of the end plate 190 at the end of the stack 100 and supplies fuel to the fuel flow path 174 in the stack 100. The fuel supplying unit 300 may be one of various type pumps such as an air pressure pump, a diaphragm pump and a motor pump, but not limited thereto.

A fuel tank 400 stores a hydrogen-containing fuel, such as methanol, ethanol, or butane. The fuel tank 400 is connected to the fuel supplying unit and supplies the stored fuel to the fuel supplying unit. The fuel tank 400 may comprise crude fuel or diluted fuel that has been diluted to a predetermined concentration. The fuel tank 400 may be formed in any suitable type that used in a fuel cell system.

Next, the electrical coupling in the fuel cell system according to one embodiment will be explained. FIG. 9 is a side cross-sectional view illustrating electrical coupling relationship of the stack 100.

Referring to FIG. 9, the stack 100 comprises the membrane electrode assemblies 110 and the separators 150 and 170 stacked alternately with each other. In the illustrated embodiment, the membrane electrode assemblies 110 are stacked so that the same electrodes of the membrane electrode assembly 110 face each other. That is, the membrane electrode assemblies 110 are stacked so that the cathode electrodes 114 face each other and the anode electrodes 116 face each other. In addition, the separator 130 comprises the cathode separator 150 and the anode separator 170 arranged alternately between the membrane electrode assemblies 110. The cathode separator 150 comprises the first cathode current collector 152a formed in the direction of the first surface 151a of the cathode insulator 151. In addition, the cathode separator 150 comprises the second cathode current collector 152b formed in the direction of the second surface 151b of the cathode insulator 151. The anode separator 170 comprises the first anode current collector 172a formed in the direction of the first surface 171a of the anode insulator 171. In addition, the anode separator 170 comprises the second anode current collector 172b formed in the direction of the second surface 171b of the anode insulator 171.

Referring to FIG. 9, the electrical coupling relationship of the stack 100 will be explained based on the anode separator 170 arranged in center of the stack 100, the membrane electrode assembly 110 arranged in the direction of the first surface 170a of the anode separator 170, and the adjacent cathode separator 150. The anode electrode 116 of the membrane electrode assembly 110 arranged in the direction of the first surface of the anode separator 170 decomposes the fuel into electrons and hydrogen ions. The electrons released from the anode electrode 116 flow through the first anode current collector 172a of the anode separator 170. The hydrogen ions released from the anode electrode 116 flow to the cathode electrode 114 through the electrolyte membrane 112 of the membrane electrode assembly 110.

On the other hand, the anode electrode 116 of the membrane electrode assembly 110 arranged in the direction of the second surface 170b of the anode separator 170 also decomposes fuel into electrons and hydrogen ions. The electrons released from the anode electrode 116 flow through the second anode current collector 172b of the anode separator 170. The hydrogen ions released from the anode electrode 116 flow to the cathode electrode 114 through the electrolyte membrane 112 of the membrane electrode assembly 110 arranged in the direction of the second surface 170b.

Next, in the cathode electrode 114 of the membrane electrode assembly 110 arranged in the direction of the first surface of the anode separator 170, water is generated by reaction between hydrogen ions supplied through the electrolyte membrane 112, oxygen from the air, and electrons. In this time, the electrons used for water generation are supplied from the second anode current collector 172b facing around the membrane electrode assembly 110. That is, the second anode current collector 172b of the anode separator 170 is electrically coupled to the second cathode current collector 152b of the cathode separator 150 arranged in the first surface direction. In addition, the first anode current collector 172a of the anode separator 170 is electrically coupled to the first cathode current collector 152a of the cathode separator 150 arranged in the first surface direction.

Accordingly, the anode separator 170 is electrically coupled to the cathode separator 150 arranged in the direction of the first surface with which it is paired. Further, the cathode separator 150 is not directly electrically coupled to the anode separator 170 arranged in the direction of the first surface, but indirectly coupled by movement of hydrogen ions.

Similarly, the cathode separator 150 arranged in the direction of the second surface of the anode separator 170 is electrically coupled to the anode separator 170 arranged in the direction of the second surface of the cathode separator 150 with which it is paired.

On the other hand, the end plate 190 arranged at the outmost end of the stack 100 is not electrically coupled to the separator arranged inside the stack.

Figure 10:
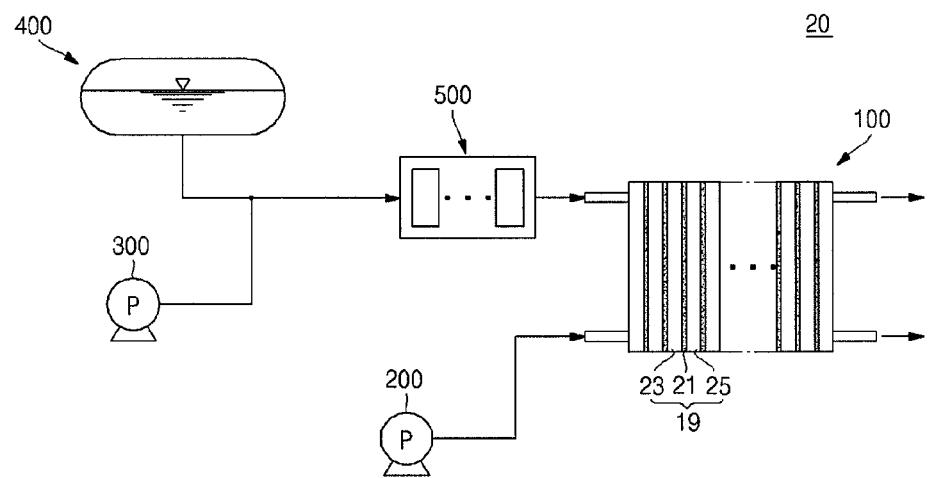
FIG. 10 is a schematic diagram illustrating another embodiment of an a fuel cell system.

Next, a fuel cell system 20 according to another embodiment will be explained. FIG. 10 is a schematic diagram illustrating a fuel cell system according to another embodiment of the present invention Referring to FIG. 10, the fuel cell system 20 comprises a stack 100, an air supplying unit 200, a fuel supplying unit 300, a fuel tank 400, and a reformer 500. The fuel cell system 20 comprises a polymer electrolyte membrane fuel cell system, which generates electrical energy by using hydrogen generated by reforming fuel. Accordingly, the fuel cell system 20 further comprises the reformer 500 for reforming fuel supplied in the fuel tank 400. The fuel cell system 20 is similar to the fuel cell system 100 according to the embodiment of FIGS. 1 to 9 except for the addition of the reformer 500. Accordingly, in the fuel cell system 20, the same reference numerals are used for same or similar to elements of the fuel cell system 10 of FIGS. 1 to 9, and here, the detailed explanation there of will be omitted. Hereinafter, only differences between the fuel cell systems will be explained.

The reformer 500 produces hydrogen gas as a main component by reforming a fuel containing hydrogen, and supplies the hydrogen gas to the stack 100. The reformer 500 can be classified into steam reforming (SR), autothermal reforming (ATR), or partial oxidation (POX) according to the reforming method. Any suitable type of reformer may be used as the reformer, and here detailed explanation will be omitted.

The fuel supplying unit 300 is connected to the reformer 500 so as to supply fuel in the fuel tank 400 to the reformer 500. Any suitable type of pump may be as the fuel supplying unit fuel supplying unit, but is not limited thereto.

The fuel tank 400 stores a hydrogen-containing fuel such as methanol, ethanol, or butane, and supplies the fuel to the reformer through the fuel supplying unit. The fuel tank 400 may be formed in any suitable type of construction used in a fuel cell system.

Hereinafter, the operation of the fuel cell system 10 according to the embodiment will be explained. The fuel supplying unit 300 supplies the fuel stored in the fuel tank 400 to the fuel feeding hole 196 formed in the end plate 190 of the stack 100. The fuel flows to the fuel flow path 174 via the fuel inlet 175 of the anode separator 170 inside the stack 100. The fuel sequentially flows to the fuel flow path 174 of the anode separator 170 inside the stack 100.

The air supplying unit 200 supplies air to the air feeding hole 195 formed in the end plate 190 of the stack 100. The air flows to the air flow path 154 via the air inlet 155 of the cathode separator 150 inside the stack 100. The air sequentially flows to the air flow path 154 of the cathode separator 150 inside the stack 100.

The air and fuel are alternately supplied to the cathode separator 150 and the anode separator 170 inside the stack 100. Accordingly, the air flows through the air path 177 formed in the anode separator 170. Further, the fuel flows through the fuel path 157 formed in the cathode separator 150.

The anode separator 170 supplies fuel to the anode electrodes 116 of the membrane electrode assemblies 110 contacting to the both surfaces of the anode separator 170 simultaneously. Further, the cathode separator 150 supplies air to the cathode electrodes 114 of the membrane electrode assemblies 110 contacting to the both surfaces of the cathode separator 150 simultaneously.

The membrane electrode assembly 110 generates electricity by a reaction between the fuel and the air supplied from the anode electrode 116 and the cathode electrode 114. The hydrogen supplied to the anode electrode 116 is decomposed into hydrogen ions and electrons. The released electrons flow to the cathode current collector 152a of the cathode separator 150 via the anode current collector 172a of the adjacent anode separator 170 that is electrically coupled to the cathode separator 150, and the electrons flow to the cathode electrode 114. That is, the electrons are supplied to the cathode anode 114 of the membrane electrode assembly 110 arranged in the direction of the first surface of the anode separator 170. The released hydrogen ions are supplied to the cathode electrode 114 of the membrane electrode assembly 110 via the electrolyte membrane 112. The oxygen supplied to the cathode electrode 114 reacts with the hydrogen ions and electrons supplied from the anode electrode 116 so as to generate water. In the stack 100, the electricity generating reaction as above occurs between the stacked plurality of anode separators 170, the membrane electrode assembly 110s and the cathode separator 150.

The fuel cell system 10 can output electrical energy to an electronic device by the electricity generating reaction occurring in the stack 100.

Because the fuel cell system 10 supplies air or fuel to the cathode electrode 114 or the anode electrode 116 simultaneously via one separator, the thickness of the stack 100 is relatively thinner. That is, because a conventional separator comprises an air flow path for air supply formed on a first surface and a fuel flow path for fuel supply formed on a second surface, a separator plate should be interposed for separating the air flow path and the fuel flow path. However, the separator discussed above does not comprise a separator plate, and accordingly, the thickness of the separator is relatively thinner. Accordingly, the fuel cell system 10 has a relatively small volume and improved energy output.

As described above, the fuel cell system produces the following effects. First, because any one of the air paths or the fuel paths is formed through the separator from the first surface to the second surface, the thickness of the separator is relatively thinner so as to reduce entire volume of the stack. Second, the fuel cell system can decrease the thickness of the stack relatively so as to reduce the volume of the fuel cell and simultaneously improve energy output.

It should be understood by those of ordinary skill in the art that various replacements, modifications, and changes in the form and details may be made without departing from the spirit and scope of the present disclosure as defined by the following claims. Therefore, it is to be appreciated that the above described embodiments are for purposes of illustration only and are not to be construed as limitations.

What is claimed is:

1. A fuel cell system, comprising:
an air supplying unit in fluid communication with a fuel cell stack;
a fuel supplying unit in fluid communication with the fuel cell stack; and
a fuel tank in fluid communication with the fuel cell stack,
wherein the fuel cell stack comprises a plurality of membrane electrode assemblies stacked with cathode electrodes of adjacent membrane electrode assemblies facing each other and anode electrodes of adjacent membrane electrode assemblies facing each other, and a plurality of separators interposed between the membrane electrode assemblies, each separator comprising a flow path passing therethrough from a first surface of the separator to a second surface of the separator in a region corresponding to a region of each cathode electrode or anode electrode of an adjacent membrane electrode assembly,
wherein at least one of the plurality of separators comprises an insulation layer, a first current collector and a second current collector coupled to a first surface and a second surface of the insulation layer, respectively,
wherein the flow path passes through the insulation layer, the first current collector, and the second current collector,
wherein the insulation layer comprises:
a first region between the first current collector and the second current collector, and
a second region which extends out from the first current collector and the second current collector,
wherein the flow path passes between the first region of the insulation layer and the second region of the insulation layer, and
wherein the first region and the second region are located in the same plane of the separator.

2. The fuel cell system of claim 1, wherein the separator comprises:
a cathode separator comprising a cathode insulation layer, a first cathode current collector formed on a first face of the cathode insulation layer, and a second current collector formed on a second face of the cathode insulation layer, and wherein the flow path is an air flow path; and an anode separator comprising an anode insulation layer, a first anode current collector formed on a first face of the anode insulation layer, and a second anode current collector formed on a second face of the anode insulation layer, and wherein the flow path is a fuel flow path.

3. The fuel cell system of claim 2, wherein the air flow path and the fuel flow path each comprise a zig-zag, meander-type, or serpentine portion.

4. The fuel cell system of claim 2, wherein the cathode separator comprises an air inlet at an upper part of a first side of the cathode separator connected to the air flow path, and an air outlet formed at a lower part of the second side of the cathode separator connected to the air flow path, and wherein the anode separator comprises a fuel inlet at a lower part of a first side of the anode separator connected to the fuel flow path, and a fuel outlet at an upper part of the second side of the anode separator connected to the fuel flow path.

5. The fuel cell system of claim 4, wherein the cathode separator comprises a fuel path at the lower part of the first side of the cathode separator and at the upper part of the second side of the cathode separator, respectively, and wherein the anode separator comprises an air path at the upper part of the first side of the anode separator and at the lower part of the second side of the anode separator, respectively.

6. The fuel cell system of claim 2, wherein the cathode separator comprises a first cathode terminal extending above the first cathode current collector and a second cathode terminal extending above the second cathode current collector, and wherein the anode separator comprises a first anode terminal extending above the first anode current collector and a second anode terminal extending above the second anode current collector.

7. The fuel cell system of claim 6, wherein the first anode terminal is electrically coupled to the first cathode terminal of the cathode separator adjacent thereto in the direction of the first anode terminal, and wherein the second anode terminal is electrically coupled to the second cathode terminal of the cathode separator adjacent thereto in the direction of the first anode terminal.

8. The fuel cell system of claim 2, wherein the first anode current collector is electrically coupled to the first cathode current collector of the cathode separator adjacent thereto in the direction of the first anode current collector, and wherein the second anode current collector is electrically coupled to the second cathode current collector of the cathode separator adjacent thereto in the direction of the first anode current collector.

9. The fuel cell system of claim 4, wherein the stack comprises end plates contacting outer faces of membrane electrode assemblies located at each end of the stacked membrane electrode assemblies, and wherein the end plates comprise end insulation layers, end current collectors formed on surfaces facing to the membrane electrode assemblies, and flow path grooves formed in the end current collectors and the insulation layers.

10. The fuel cell system of claim 9, wherein the polarities of the end current collectors of the end plates are different from each other.

11. The fuel cell system of claim 9, wherein the flow path groove comprises an air flow path or a fuel flow path according to the polarity of the end current collectors, and wherein the air flow path has a shape corresponding to the air path and the fuel flow path has a shape corresponding to the fuel path.

12. The fuel cell system of claim 9, wherein the end plates comprise an air feeding hole at an end of the stack at a position corresponding to the air inlet, and a fuel feeding hole at an end of the stack at a position corresponding to the fuel inlet.

13. The fuel cell system of claim 12, wherein the end plates comprise an air outlet located at an end of the stack at a position corresponding to the air outlet, and a fuel outlet at an end of the stack at a position corresponding to the fuel outlet.

14. The fuel cell system of claim 4, wherein the membrane electrode assembly comprises an electrolyte membrane, a cathode electrode formed on a first face of the electrolyte membrane, an anode electrode formed on a second face of the electrolyte membrane, and a gasket surrounding the electrolyte membrane, and side faces of the cathode electrode and the anode electrode, and wherein the gasket comprises gasket paths at positions corresponding to the air inlet, the air outlet, the fuel inlet, and the fuel outlet.

15. The fuel cell system of claim 1, wherein the fuel tank is in fluid communication with the fuel supplying unit and wherein a reformer is installed between the fuel supplying unit and the stack.

* * * * *